(12) United States Patent
Baek et al.

(10) Patent No.: US 9,070,071 B2
(45) Date of Patent: Jun. 30, 2015

(54) CARD-TYPE INFORMATION RECORDING MEDIUM HAVING EMBEDDED ANTENNA FOR NEAR FIELD COMMUNICATION AND MANUFACTURING METHOD THEREOF

(71) Applicant: MTEKVISION CO., LTD., Seongnam-si, Gyeonggi-do (KR)

(72) Inventors: Dong-Hyun Baek, Seoul (KR);
Byoung-Ok Lee, Seongnam-si (KR);
Jung-Hyun Cho, Siheung-si (KR);
Eun-Su Kim, Taejon (KR)

(73) Assignee: MTEKVISION CO., LTD., Seongnam-si (KR)

( * ) Notice: Subject to any disclaimer, the term of this patent is extended or adjusted under 35 U.S.C. 154(b) by 0 days.

(21) Appl. No.: 14/308,787

(22) Filed: Jun. 19, 2014

(65) Prior Publication Data

US 2014/0299667 A1 Oct. 9, 2014

Related U.S. Application Data

(62) Division of application No. 13/423,363, filed on Mar. 19, 2012.

(30) Foreign Application Priority Data

Apr. 6, 2011 (KR) .......................... 10-2011-0031476

(51) Int. Cl.
*G06K 19/06* (2006.01)
*G06K 19/077* (2006.01)

(52) U.S. Cl.
CPC ..... *G06K 19/07783* (2013.01); *Y10T 29/49016* (2015.01); *G06K 19/07722* (2013.01); *G06K 19/07769* (2013.01); *G06K 19/07771* (2013.01)

(58) Field of Classification Search
CPC ................. H01L 2924/00; H01L 2224/16225; H01L 2224/32225; H01L 2224/13144; H01L 2224/73204; H01L 2224/83192; H01L 2224/97; H01L 2924/0002; H01L 2924/07802; G06K 19/07749
See application file for complete search history.

(56) References Cited

U.S. PATENT DOCUMENTS

| 2002/0159242 | A1* | 10/2002 | Nakatani et al. | 361/760 |
| 2009/0146898 | A1* | 6/2009 | Akiho et al. | 343/787 |
| 2012/0007787 | A1* | 1/2012 | Schantz et al. | 343/788 |

FOREIGN PATENT DOCUMENTS

| KR | 10-2008-0113185 A | 12/2008 |
| KR | 20-2010-0002353 A | 3/2010 |

* cited by examiner

*Primary Examiner* — Thien M Le
*Assistant Examiner* — Tae Kim
(74) *Attorney, Agent, or Firm* — Birch, Stewart, Kolasch & Birch, LLP

(57) ABSTRACT

A card-type information recording medium including a PCB that has a loop antenna pattern and a routing pattern formed on the top surface and the bottom surface thereof through the use of an etching process, an NFC communication unit and a USIM card unit that are horizontally mounted on the top of the PCB, and a molding material that is formed on the top of the PCB so as to cover the NFC communication unit and the USIM card unit.

6 Claims, 7 Drawing Sheets

CARD-TYPE INFORMATION RECORDING MEDIUM HAVING EMBEDDED ANTENNA FOR NEAR FIELD COMMUNICATION AND MANUFACTURING METHOD THEREOF

CROSS-REFERENCE TO RELATED APPLICATIONS

This application is a Divisional of U.S. application Ser. No. 13/423,363, filed Mar. 19, 2012, which claims priority under 35 USC 119 from Korean Patent Application No. 10-2011-0031476 filed Apr. 6, 2011. The entire contents of all of the above-identified applications are hereby incorporated by reference.

BACKGROUND

1. Technical Field

The present invention relates to a card-type information recording medium having an embedded antenna for near field communication (NFC) and a manufacturing method thereof.

2. Related Art

With today's development of electronic information communication technology, mobile communication terminals allowing a user to freely use a radio communication service regardless of time and place have been widely spread. Such mobile communication terminals have multimedia functions as well as a radio communication function and have more and more functions, for the purpose of satisfaction of users' needs.

A SIM card storing user-relevant information such as an identification number or a registered phone number of a user is generally mounted on a mobile communication terminal. Examples of the SIM card include a SIM mounted on GSM type communication terminals, a USIM (Universal Subscriber Identify Module) mounted on CDMA type communication terminals, and an R-SIM (Roaming Subscriber Identify Module) mounted on GSM type and CDMA type communication terminals.

Recently, there has been a trial of applying an NFC (Near Field Communication) technique as micropayment means for replacement for the RFID to mobile communication terminals. The NFC technique includes constituents such as a communication interface operating through inductive coupling and has two or more operation modes including a reader mode and a card emulation mode.

Methods of manufacturing a mobile communication terminal to have an NFC antenna embedded in the mobile communication terminal or embedding an antenna in a SIM card taking charge of security to perform communications are considered to provide various services using the NFC technique.

FIG. 1A is a plan view of an RFID reader USIM having an embedded antenna according to the related art. FIG. 1B is a schematic sectional view of the RFID reader USIM having an embedded antenna according to the related art.

As shown in FIG. 1A, an antenna 120 is formed by mounting a SIM memory 110 on a PCB of a SIM card 100 and designing an antenna pattern in a space other than the SIM memory 110 through the use of an etching process.

When the antenna 120 is formed in the SIM card 100, a single feed port pad is added to the SIM card 100 and is connected to the antenna 120 formed through the etching process via a ground (GND) pin 130 formed in advance in the SIM memory 110. That is, a feed pin 140 of the antenna 120 is connected to the single feed port pad to transmit and receive a signal to and from a circuit board 200 and is connected to the circuit board 200 via the ground pin 130 of the SIM memory 110 for ground.

However, passive elements are necessarily required for adding RFID read and tag to the USIM device (for example, USIM card). Accordingly, the thickness is restricted in mounting the antenna including the passive elements and the units suitable for applications on the USIM device.

When the antenna is mounted on the USIM device, the length of the antenna is dependent on the frequency or wavelength. Accordingly, when the frequency is low, there is a problem in that it is not easy to manufacture the USM device including a loop antenna.

A contact (see FIG. 1B) may be deteriorated by long-term use to cause contact failure, thereby lowering performance index or causing the device out of order.

Sockets of most mobile communication terminals on which the USIM device is mounted are formed of a conductor. Accordingly, a magnetic field (H field) radiated from the RFID reader is disturbed by the conductor, thereby causing recognition reduction and recognition failure.

There is a need for methods of manufacturing an outer structure of a mobile terminal or separating a top cover and a bottom cover from each other so as to insert an antenna between the top cover and the USIM socket, which causes an additional increase in cost.

The above-mentioned related art is technical information possessed to make the invention or learned in the course of making the invention by the inventor, and cannot thus be said to be technical information known to the public before filing the invention.

SUMMARY

An advantage of some aspects of the invention is that it provides a card-type information recording medium having an embedded antenna for NFC communication and a manufacturing method thereof, which can improve compatibility and transplantability of an NFC USIM device by embedding an NFC unit and a loop antenna in the USIM device.

Another advantage of some aspects of the invention is that it provides a card-type information recording medium having an embedded antenna for NFC communication and a manufacturing method thereof, which can reduce the terminal substrate replacement cost due to addition of a communication unit and can allow NFC communications between different types of mobile terminals mounted with a USIM device by only adding an application to an operating system of the mobile terminals.

Still another advantage of some aspects of the invention is that it provides a card-type information recording medium having an embedded antenna for NFC communication and a manufacturing method thereof, which can perform functions of NFC and RFID read/tag by only mounting the USIM device without adding any module or any constituent having an antenna function to a mobile terminal.

Still another advantage of some aspects of the invention is that it provides a card-type information recording medium having an embedded antenna for NFC communication and a manufacturing method thereof, which does not need any constituent having an antenna function or does not need to deform the inside/outside of a mobile terminal so as not to cause additional cost and can improve a recognizable range by including a ferrite sheet.

Other advantages of the invention will be easily understood from the following description.

According to an aspect of the invention, there is provided a card-type information recording medium including: a first-layer PCB; a second-layer PCB that is disposed on the bottom of the first-layer PCB and that is mounted with an NFC communication unit and a USIM card unit; and a third-layer PCB that is disposed on the bottom of the second-layer PCB, wherein antenna patterns are formed on the top surface of the first-layer PCB and the top surface of the second-layer PCB, respectively, and the formed antenna patterns are electrically connected to each other.

A ferrite sheet may be disposed between the second-layer PCB and the third-layer PCB.

A routing pattern for the NFC communication unit and the USIM card unit may be formed on the bottom surface of the second-layer PCB, and a contact for electrical connection to a terminal mounted with the card-type information recording medium may be formed on the bottom surface of the third-layer PCB.

The first-layer PCB, the second-layer PCB, and the third-layer PCB may be unified through a lamination process.

The card-type information recording medium may be one or more of a SIM card and a USIM card.

According to another aspect of the invention, there is provided a method of manufacturing a card-type information recording medium, including the steps of: forming a second-layer PCB mounted with an NFC communication unit and a USIM card unit; forming a conductor on the top surface and the bottom surface of the second-layer PCB, the top surface of a first-layer PCB disposed on the top of the second-layer PCB, and the bottom surface of a third-layer PCB disposed on the bottom of the second-layer PCB; etching the conductors formed on the surfaces to form an antenna pattern on the top surface of the first-layer PCB and the top surface of the second-layer PCB, to form a routing pattern for the NFC communication unit and the USIM card unit on the bottom surface of the second-layer PCB, and to form a contact for electrical connection to a terminal mounted with the card-type information recording medium on the bottom surface of the third-layer PCB; and performing a lamination process to unify the first-layer PCB, the second-layer PCB, and the third-layer PCB.

The step of forming the second-layer PCB may include: a step of mounting an NFC communication unit and a USIM card unit on a second sub PCB; and a step of locating a first sub PCB on the top of the second sub PCB and then laminating the first sub PCB and the second sub PCB.

The antenna patterns formed on the top surface of the first-layer PCB and the top surface of the second-layer PCB may be electrically connected to each other.

A ferrite sheet may be disposed between the second-layer PCB and the third-layer PCB in the step of performing the lamination process.

The card-type information recording medium may be one or more of a SIM card and a USIM card.

According to still another aspect of the invention, there is provided a card-type information recording medium including: a PCB that has a loop antenna pattern and a routing pattern formed on the top surface and the bottom surface thereof through the use of an etching process; an NFC communication unit and a USIM card unit that are horizontally mounted on the top of the PCB; and a molding material that is formed on the top of the PCB so as to cover the NFC communication unit and the USIM card unit.

A ferrite sheet may be disposed in the molding material so as to be separated from the NFC communication unit and the USIM card unit.

The loop antenna patterns formed on the top surface and the bottom surface of the PCB may be electrically connected to each other.

The molding material may be an insulating resin.

According to still another aspect of the invention, there is provided a method of manufacturing a card-type information recording medium, including the steps of: forming a conductor on the top surface and the bottom surface of a PCB and then forming a loop antenna pattern and a routing pattern on the top surface and the bottom surface through the use of an etching process; horizontally mounting an NFC communication unit and a USIM card unit on the top of the PCB; and covering the top of the PCB with a molding material so as to receive the NFC communication unit and the USIM card unit therein.

The step of covering the top of the PCB may include: a step of primarily covering the top of the PCB with the molding material so as to receive the NFC communication unit and the USIM card unit therein; a step of disposing a ferrite sheet on the top surface of the molding material; and a step of secondarily covering the top of the ferrite sheet so as to receive the ferrite sheet therein.

The loop antenna patterns formed on the top surface and the bottom surface of the PCB may be electrically connected to each other.

The molding material may be an insulating resin.

Other aspects, features, and advantages of the invention will become apparent from the accompanying drawings, the appended claims, and the detailed description.

According to the aspects of the invention, it is possible to improve compatibility and transplantability of an NFC USIM device by embedding an NFC unit and a loop antenna in the USIM device.

It is also possible to reduce the terminal substrate replacement cost due to addition of a communication unit and to allow NFC communications between different types of mobile terminals mounted with a USIM device by only adding an application to an operating system of the mobile terminals.

It is also possible to perform functions of NFC and RFID read/tag by only mounting the USIM device without adding any module or any constituent having an antenna function to a mobile terminal.

It is not necessary to add any constituent having an antenna function or to deform the inside/outside of a mobile terminal so as not to cause additional cost and to improve a recognizable range by including a ferrite sheet.

DESCRIPTION OF EXEMPLARY EMBODIMENTS OF THE INVENTION

Figure 1A:
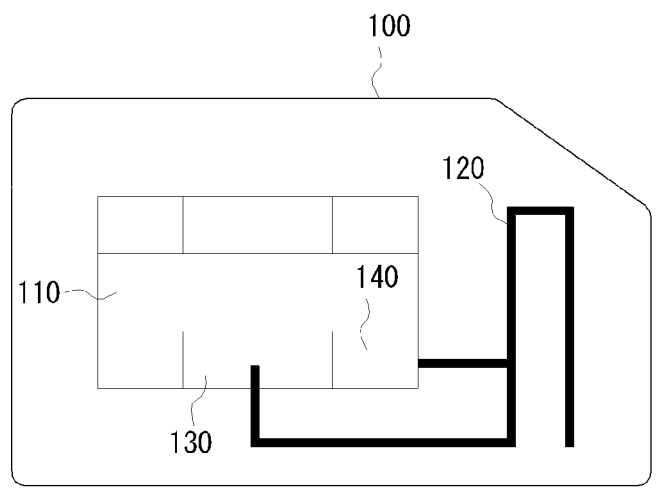
FIG. 1A is a plan view of an RFID reader USIM having an embedded antenna according to the related art.
Figure 1B:
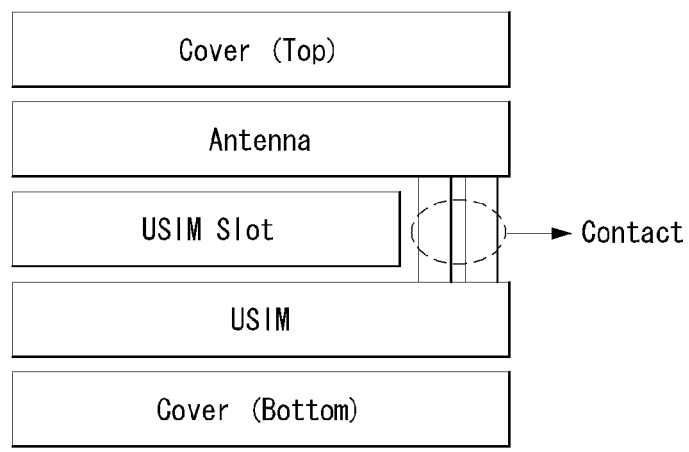
FIG. 1B is a schematic sectional view of the RFID reader USIM having an embedded antenna according to the related art.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "coupled" or "connected" to another element, it should be understood that the element is directly coupled or connected to another element or still another element is interposed therebetween. On the contrary, when it is mentioned that an element is "directly coupled" or "directly connected" to another element, it should be understood that still another element is not interposed therebetween.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Terms, "unit", "-er(-or)", "module", and the like, described in the specification mean a unit for performing at least one function or operation and can be embodied by hardware, by software, or by a combination of hardware and software.

In describing the invention with reference to the accompanying drawings, like elements are referenced by like reference numerals or signs regardless of the drawing numbers and description thereof is not repeated. When it is determined that detailed description of known techniques involved in the invention makes the gist of the invention obscure, the detailed description thereof will not be made.

Although a USIM (Universal Subscriber Identity Module) device will be mainly described below as an example of a card-type information recording medium in the specification, the card-type information recording medium is not limited to the USIM.

Figure 2A:
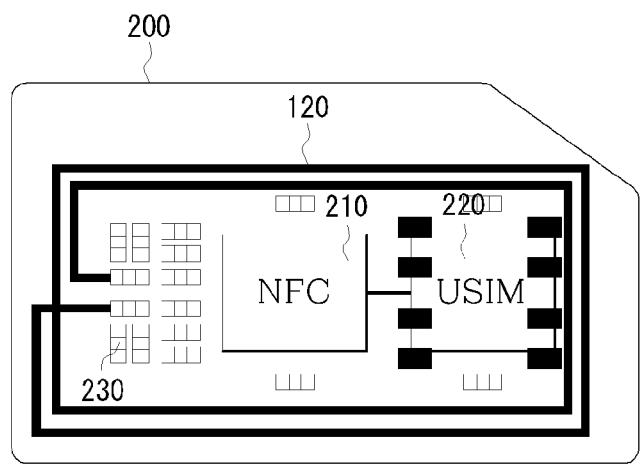
FIG. 2A is a diagram conceptually illustrating the planar configuration of a USIM device having an embedded antenna according to an embodiment of the invention.
Figure 2B:
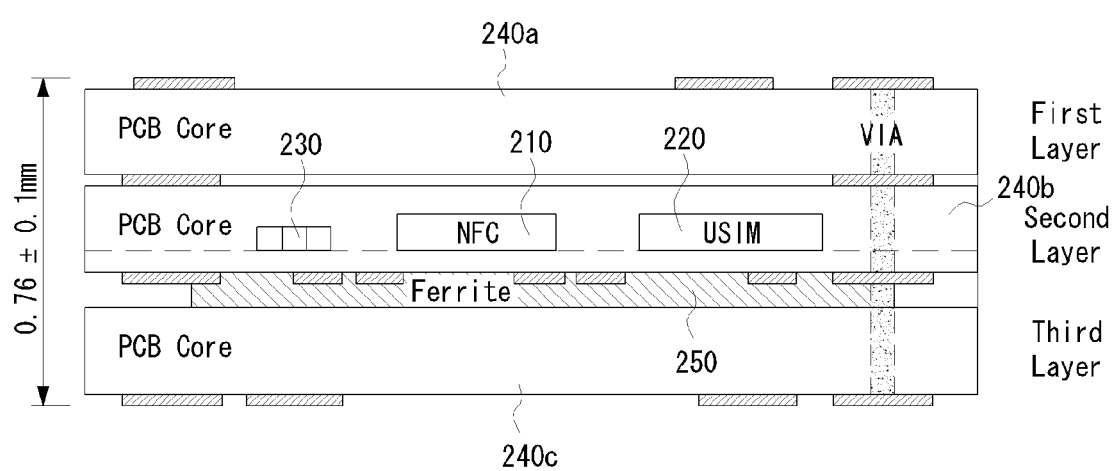
FIG. 2B is a schematic sectional view of the USIM device having an embedded antenna according to the embodiment of the invention.

FIG. 2A is a diagram conceptually illustrating the planar configuration of a USIM device having an embedded antenna according to an embodiment of the invention. FIG. 2B is a schematic sectional view of the USIM device having an embedded antenna according to the embodiment of the invention.

As shown in FIGS. 2A and 2B, a USIM device 200 having an embedded antenna according to an embodiment of the invention includes an NFC communication unit 210, a USIM card unit 220, one or more passive elements 230, and an antenna 120.

The NFC communication unit 210 performs near-field data communication to perform an RFID read function and/or tag function on the outside, for example, at a frequency band of 13.56 MHz. The USIM card unit 220 is connected to a baseband chip disposed in the main body of a mobile terminal to perform user authentication, electronic transaction, and the like. The NFC communication unit 210 and the USIM card unit 220 may include semiconductor chips constructed for their applications, respectively.

One or more passive elements 230 include one or more of a resistor, a capacitor, and a conductor. The antenna 120 allows the NFC communication unit 210 to communicate in a non-contact type near field communication manner or allows the USIM card unit 220 to perform RF communication.

As shown in the drawings, the USIM device 200 having an embedded antenna according to this embodiment includes three layers of PCBs 240a, 240b, and 240c. The antenna 120 is formed on the respective layers of PCBs. The NFC communication unit 210, the USIM card unit 220, and the passive elements 230 are mounted thereon.

In the USIM device 200 having an embedded antenna, antenna patterns are additionally formed on the top surface and the bottom surface of the second-layer PCB 240b to improve the functional aspect of the antenna 120, and a ferrite sheet 250 is disposed between the second-layer PCB 240b and the third-layer PCB 240c to reinforce a radiation pattern (H-Field) of the antenna.

The USIM device 200 having an embedded antenna according to this embodiment has a size corresponding to the standard size of typical card-type information recording mediums (for example, a SIM card and a USIM card), and is mounted on a mounting groove formed on the rear surface of a mobile terminal to perform an NFC communication function and a SIM card function. Accordingly, it is not necessary to deform the outer structure (for example, the mounting groove) of the mobile terminal and to add a new module or antenna so as to mount and use the USIM device 200 having an embedded antenna.

A process of manufacturing the USIM device 200 having an embedded antenna according to this embodiment will be described below with reference to FIG. 3 and FIGS. 4A to 4E.

Figure 3:
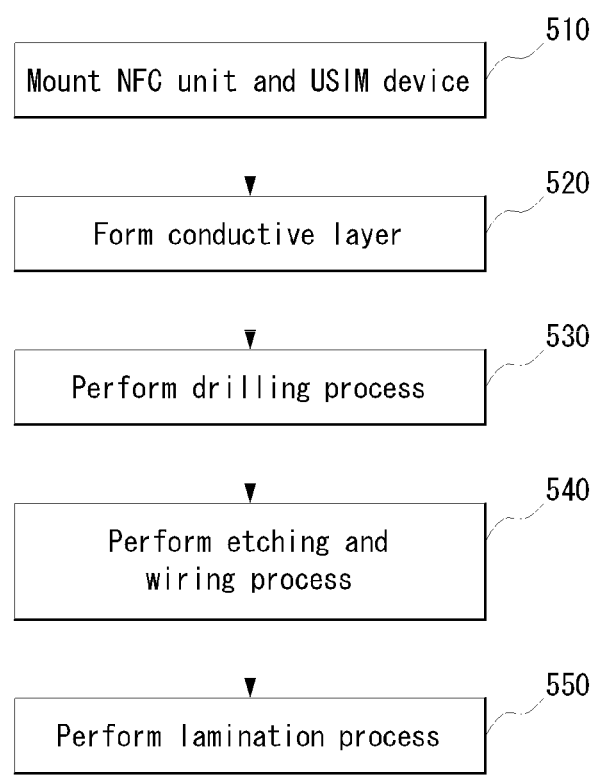
FIG. 3 is a flowchart illustrating the flow of a process of manufacturing the USIM device having an embedded antenna according to the embodiment of the invention.

FIG. 3 is a flowchart illustrating the flow of a process of manufacturing the USIM device having an embedded antenna according to the embodiment of the invention. FIGS. 4A to 4E are diagrams illustrating the process steps of manufacturing the USIM device having an embedded antenna according to the embodiment of the invention.

Referring to FIG. 3, in step 510, the second layer 240b mounted with the NFC communication unit 210, the USIM card unit 220, and the passive elements 230 is formed.

Figure 4A:
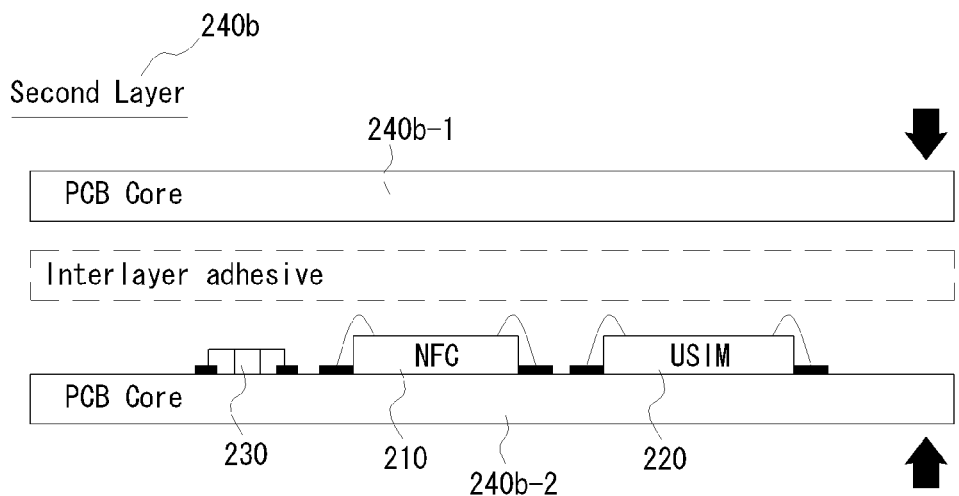
FIGS. 4A to 4E are diagrams illustrating the process steps of manufacturing the USIM device having an embedded antenna according to the embodiment of the invention.

As shown in FIG. 4A, the NFC communication unit 210, the USIM card unit 220, and the passive elements 230 are mounted on a second sub PCB 240b-2 out of two sub PCBs 240b-1 and 240b-2 having been subjected to an exposure process and an etching process. At this time, for example, a wire bonding process and/or a flip chip process can be used.

Thereafter, a PCB laminating process is performed using an interlayer adhesive to laminate the two sub PCBs 240b-1 and 240b-2.

Referring to FIG. 3 again, in step 520, conductors 610a, 610b, 610c, and 610d are deposited on the surfaces of the PCBs 240a, 240b, and 240c as a whole so as to extend a routing layer.

Figure 4B:
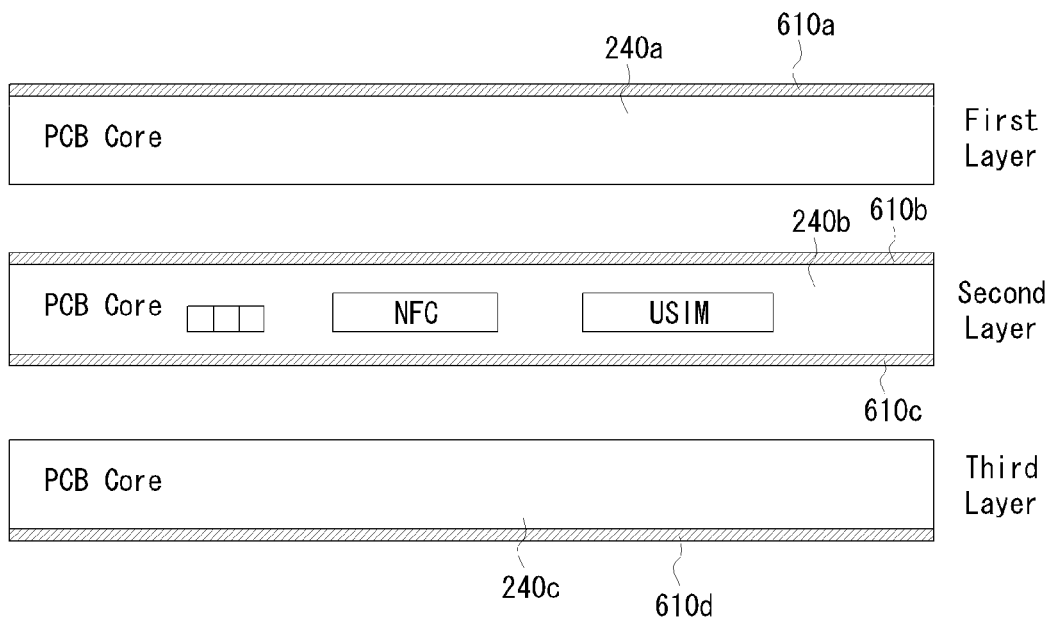

That is, as shown in FIG. 4B, the conductors are deposited on the top surface of the first-layer PCB 240a, the top surface and the bottom surface of the second-layer PCB 240b, and the bottom surface of the third-layer PCB 240c.

Referring to FIG. 3 again, in step 530, a drilling process for electrical connection between the PCBs 240a, 240b, and 240c is performed.

Figure 4C:
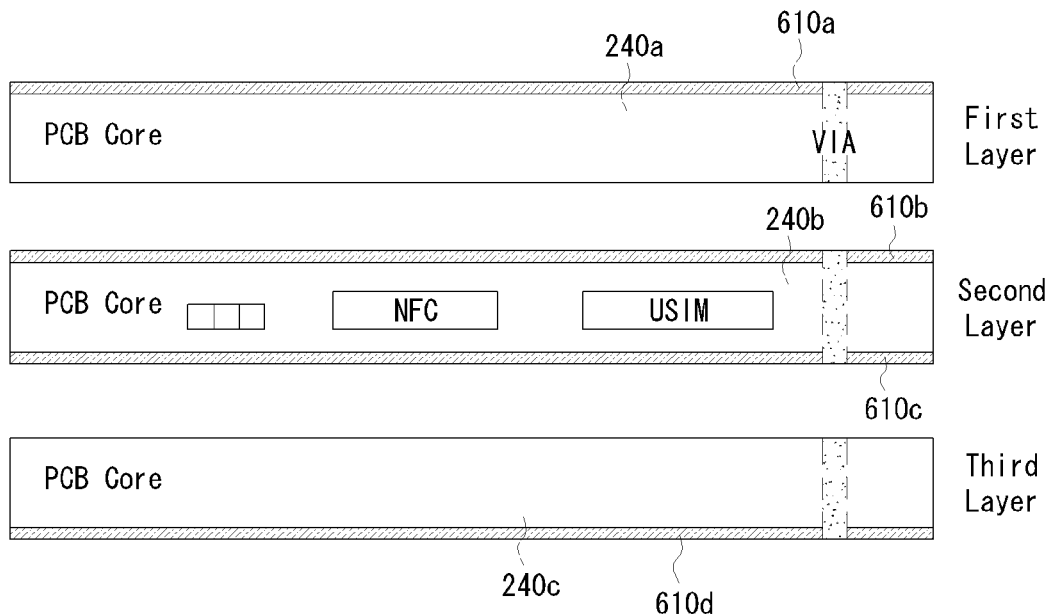

As shown in FIG. 4C, contact holes (vias) are formed in the PCBs 240*a*, 240*b*, and 240*c* through the drilling process.

Referring to FIG. 3 again, in step 540, an etching and wiring process is performed to form routing patterns and/or loop antenna patterns on the PCBs 240*a*, 240*b*, and 240*c*.

Figure 4D:
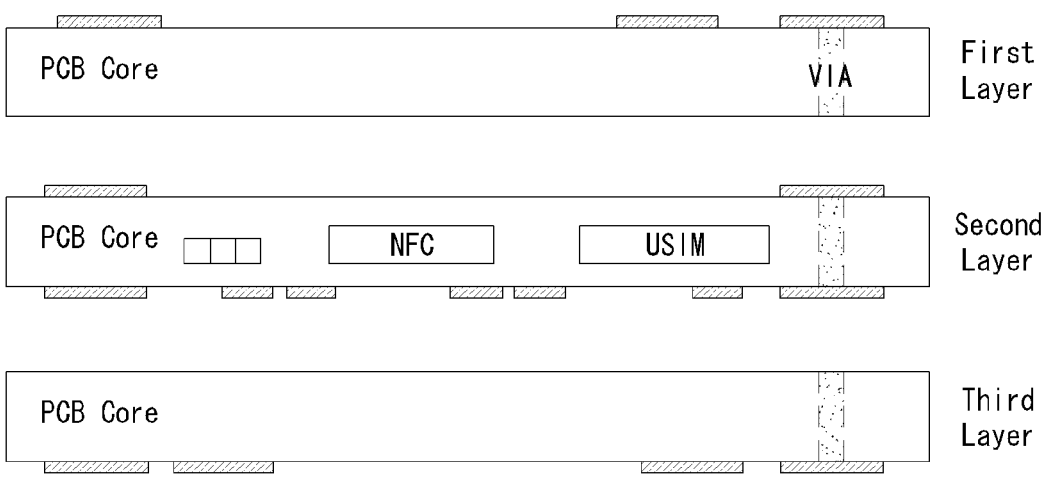

As shown in FIG. 4D, the loop antenna is formed on the top surface of the first-layer PCB 240*a* through the etching process and the loop antenna is extended through the etching process on the conductor deposited on the top surface of the second-layer PCB 240*b*. That is, the loop antennas are formed on the top surface of the first layer PCB 240*a* and the top surface of the second-layer PCB 240*b* and are electrically connected to each other through the contact hole.

Routing patterns of various circuits are formed on the bottom surface of the second-layer PCB 240*b* and a USIM contact is formed on the bottom surface of the third-layer PCB 240*c*.

Figure 4E:
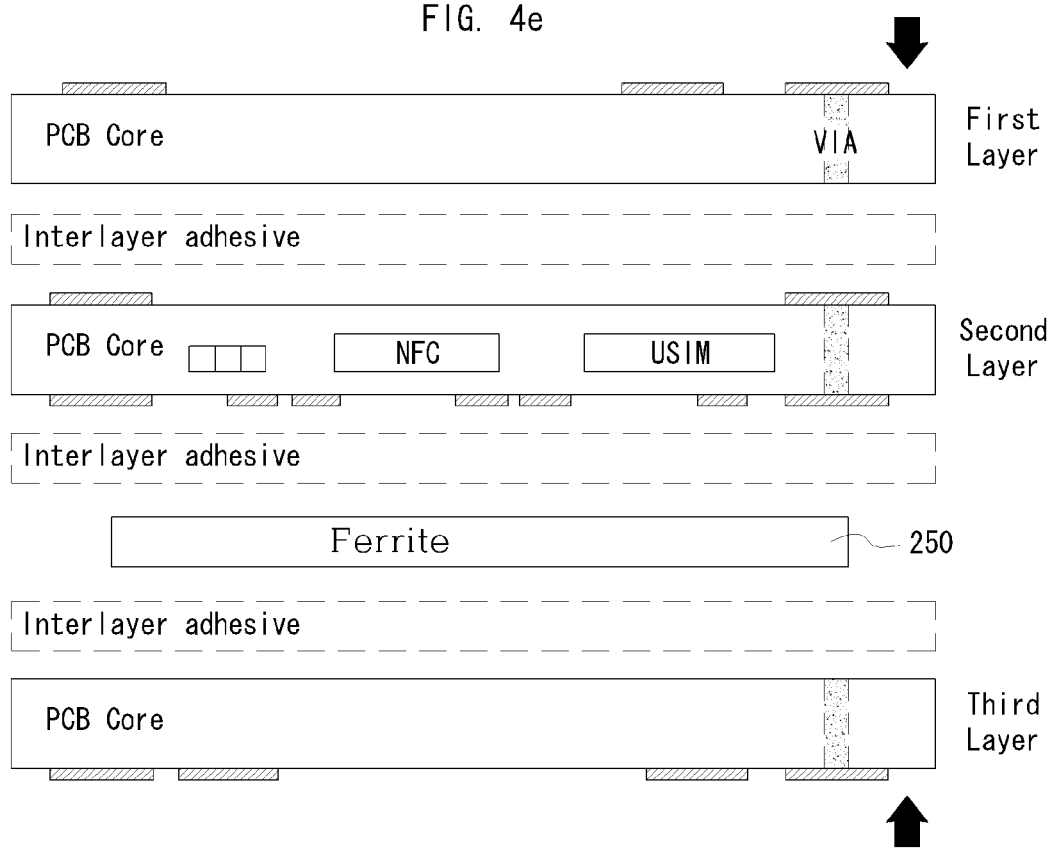

Referring to FIG. 3 again, in step 550, a lamination process is performed on the PCBs 240*a*, 240*b*, and 240*c* having been subjected to the wiring process, as shown in FIG. 4E. At this time, a ferrite sintered compact 250 may be disposed between the second-layer PCB 240*b* and the third-layer PCB 240*c* so as to reinforce the radiation pattern (H Field) of the antenna.

Figure 5A:
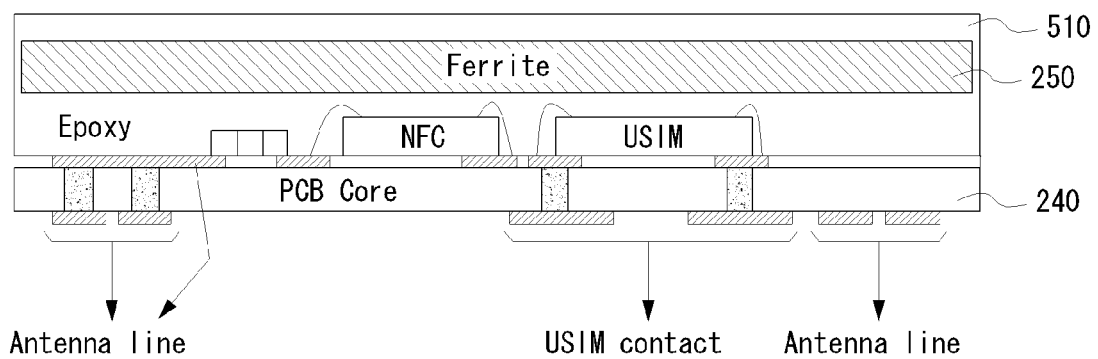
FIG. 5A is a schematic sectional view of a USIM device having an embedded antenna according to another embodiment of the invention.
Figure 5B:
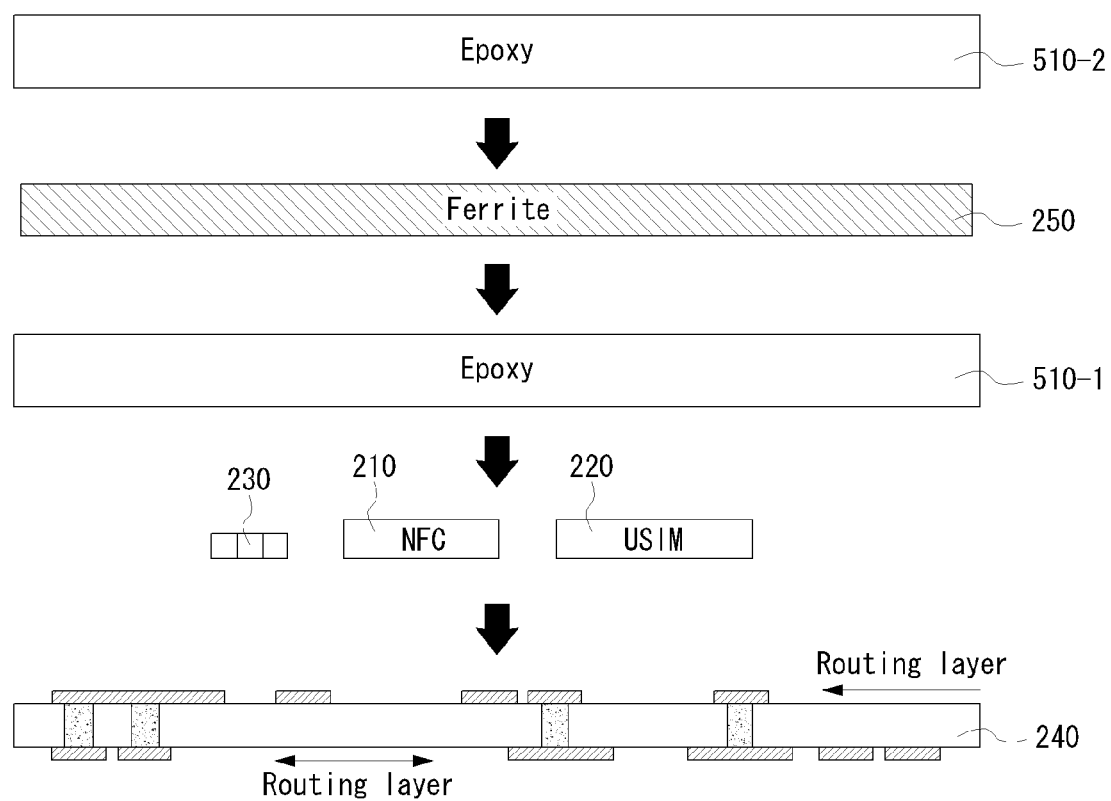
FIG. 5B is a diagram schematically illustrating the process of manufacturing the USIM device having an embedded antenna according to another embodiment of the invention.

FIG. 5A is a schematic sectional view of a USIM device having an embedded antenna according to another embodiment of the invention. FIG. 5B is a diagram schematically illustrating the process of manufacturing the USIM device having an embedded antenna according to another embodiment of the invention.

The USIM device 200 having an embedded antenna shown in FIG. 5A includes a single-layered of PCB and a loop antenna pattern is formed on the top surface and the bottom surface of the PCB.

The process of manufacturing the USIM device 200 having an embedded antenna according to this embodiment will be described below in brief with reference to FIG. 5B.

First, a conductor is deposited on the top surface and the bottom surface of the PCB 240 and an etching process is performed thereon to form a routing pattern and a loop antenna pattern on the top surface and the bottom surface.

Thereafter, an NFC communication unit 210, a USIM card unit 220, and passive elements 230 are mounted on the top of the PCB having the patterns formed thereon.

Subsequently, the resultant is covered with an insulating resin (such as an epoxy resin) so as to protect the NFC communication unit 210, the USIM card unit 220, and the like mounted on the top of the PCB 240 from external impact and to maintain the electrical insulation.

Then a ferrite sheet 250 is attached to the top surface covered with the insulating resin. By attaching the ferrite sheet 250, it is possible to protect the radiation pattern of a magnetic field which can be distorted in the electrical environment of a mobile terminal, thereby improving recognition.

Finally, in order to protect the ferrite sheet 250 from external physical impact, the resultant structure is covered again with an insulating resin (such as an epoxy resin) to receive the ferrite sheet 250 therein.

While the invention is described with reference to the embodiments, it will be understood by those skilled in the art that the invention can be modified and changed in various forms without departing from the concept and scope of the invention described in the appended claims.

What is claimed is:

1. A card-type information recording medium comprising:
    a PCB that has a loop antenna pattern and a routing pattern formed on a top surface and a bottom surface thereof through use of an etching process;
    an NFC communication unit and a USIM card unit that are horizontally mounted on the top surface of the PCB;
    a molding material that is formed on the top surface of the PCB so as to cover the NFC communication unit and the USIM card unit; and
    a ferrite sheet disposed in the molding material over the top surface of the PCB so as to be separated from the NFC communication unit and the USIM card unit by a portion of the molding material,
    wherein the ferrite sheet further covers the NFC communication unit and the USIM card unit over the top surface of the PCB.

2. The card-type information recording medium according to claim 1, wherein the loop antenna patterns formed on the top surface and the bottom surface of the PCB are electrically connected to each other.

3. The card-type information recording medium according to claim 1, wherein the molding material is an insulating resin.

4. A method of manufacturing a card-type information recording medium, comprising:
    forming a conductor on a top surface and a bottom surface of a PCB and then forming a loop antenna pattern and a routing pattern on the top surface and the bottom surface through use of an etching process;
    horizontally mounting an NFC communication unit and a USIM card unit on the top surface of the PCB; and
    covering the top surface of the PCB with a molding material so as to receive the NFC communication unit and the USIM card unit therein,
    wherein the covering of the top surface of the PCB includes:
    firstly covering the top surface of the PCB with the molding material so as to receive the NFC communication unit and the USIM card unit therein;
    disposing a ferrite sheet on a top surface of the molding material so as to be separated from the NFC communication unit and the USIM card unit by a portion of the molding material, wherein the ferrite sheet further covers the NFC communication unit and the USIM card unit over the top surface of the PCB; and
    secondly covering a top surface of the ferrite sheet so as to receive the ferrite sheet therein.

5. The method according to claim 4, wherein the loop antenna patterns formed on the top surface and the bottom surface of the PCB are electrically connected to each other.

6. The method according to claim 4, wherein the molding material is an insulating resin.

* * * * *